United States Patent [19]
Andres et al.

[11] 3,865,557

[45] Feb. 11, 1975

[54] AuIn$_2$ AS A CRYOGENIC THERMOMETER OR REFRIGERANT

[75] Inventors: Klaus Andres; Ernest Bucher, both of Berkeley Heights; Jack Harry Wernick, Madison, all of N.J.

[73] Assignee: Bell Telephone Laboratories, Incorporated, Murray Hill, N.J.

[22] Filed: Nov. 9, 1973

[21] Appl. No.: 414,149

[52] U.S. Cl.................. 29/194, 29/199, 75/134 T, 75/165
[51] Int. Cl.................... B32b 15/00, C22c 31/00
[58] Field of Search............ 75/134 T, 165; 29/199, 29/194

[56] References Cited
UNITED STATES PATENTS

| | | | |
|---|---|---|---|
| 2,438,967 | 4/1948 | Ellsworth | 29/183.5 |
| 2,623,273 | 12/1952 | Murray et al. | 29/180 |
| 3,374,530 | 3/1968 | Flanders et al. | 29/484 |

*Primary Examiner*—L. Dewayne Rutledge
*Assistant Examiner*—E. L. Weise
*Attorney, Agent, or Firm*—A. N. Friedman

[57] ABSTRACT

The metallic compound AuIn$_2$ is useful as a thermometer or a refrigerant in the temperature region below 0.1°K. Its utility extends to the submillidegree Kelvin region. The thermometric parameter is its static nuclear magnetic susceptibility, which is relatively large. The refrigerating technique of adiabatic demagnetization is also applicable to the large nuclear magnetic moments of this material. The product of temperature and spin-lattice relaxation time of AuIn$_2$ is approximately constant in this temperature range and equal to 0.09 seconds-°K giving approximately 1 second relaxation time at 0.1°K and 1 minute at 1 millidegree K.

4 Claims, 3 Drawing Figures

PATENTED FEB 11 1975　　3,865,557

3,865,557

AUIN₂ AS A CRYOGENIC THERMOMETER OR REFRIGERANT

BACKGROUND OF THE INVENTION

1. Field of the Invention

The invention concerns the production and measurement of temperatures below 0.1°K.

2. Brief Description of the Prior Art

Two basic problems met by those who wish to observe phenomena or carry out physical operations at temperatures near 0°K are (1) the production of such temperatures and (2) their measurement. A common refrigerating technique and a common thermometric technique used in this temperature range depend upon the phenomenon of paramagnetism. Starting from a temperature of the order of 1°K, produced by other refrigerating techniques, the adiabatic demagnetization of paramagnetic salts such as cerium magnesium nitrate has produced temperatures in the millidegree K range (D. de Klerk, *Handbuch der Physik*, 15 (1956) 38). Temperature can be measured in this same temperature range by measurement of the paramagnetic susceptibility of these same salts. Fundamental limitations, relating to the magnitude of the magnetic moments of these materials, make their use for these purposes more difficult as the millidegree Kelvin temperature range is approached and all but useless in the sub-millidegree range.

In order to use the techniques described above at lower temperatures it is necessary to use paramagnetic materials whose magnetism is related to the magnetic moments of their nuclei rather than the magnetic moments of their electrons, as in the materials mentioned above. These nuclear magnetic moments are of the order of 1000 times smaller permitting in principle, the utilization of the above mentioned techniques to temperatures $10^6$ times smaller. However, since the moments are so much smaller, observation of these moments is correspondingly more difficult. Direct observation of the nuclear magnetization of these materials can be masked by magnetic impurities. In the usual case this requires the use of more complex measurement techniques such as nuclear magnetic resonance. In addition, for many materials the coupling between the nuclear spins and the lattice vibrations is very weak resulting in long relaxation times for the necessary equilibration of the temperature of the lattice and the "temperature" of the nuclear spin system.

SUMMARY OF THE INVENTION

It has been found that $AuIn_2$, when sufficiently pure, possesses several properties which make it useful for thermometry and refrigeration in the temperature range below 0.1°K, down to the submillidegree K range. The nuclear magnetic moments of this material are large since the most abundant isotopes of indium possess magnetic moments of ~ 5.5 nuclear magnetons. The material crystallizes in a cubic symmetry. This prevents any influence on the nuclear magnetism by electron quadrupole effects. $AuIn_2$ has been found to possess a relatively short spinlattice relaxation time. The temperature-relaxation time product is approximately 0.09 seconds-°K. Thus, the relaxation time for equilibration of the temperatures of the lattice and spin system of this material is approximately 1 second at 0.1°K and 1 minute at 1 millidegree K. $AuIn_2$ is a chemically stable metallic compound which can be soldered to other metals, in order to provide good thermal contact. With suitable care, it can be made sufficiently pure to permit measurement of the static nuclear magnetic susceptibility in the temperature range of interest with good signal-to-noise ratio. If the concentration of impurities possessing a net electronic magnetic moment, such as iron, is less than 2 mole parts per million and the amount of superconductor, such as uncombined indium, included in the solid as a second phase is less than 100 parts per million by volume, operation in a moderate static magnetic field (e.g., 200 oe) produces a condition in which only the nuclear susceptibility is observably temperature dependent, producing a useful temperature scale.

DETAILED DESCRIPTION OF THE INVENTION

Figure 1:
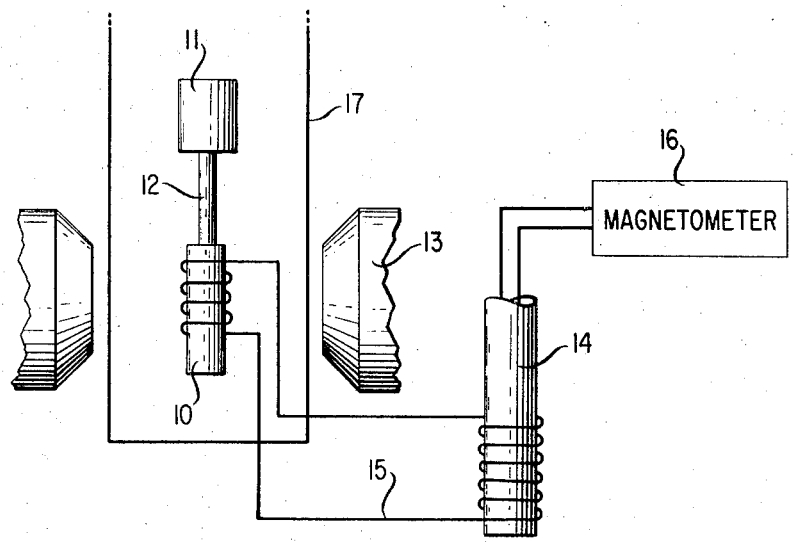
FIG. 1 is a schematic view of an exemplary apparatus in which $AuIn_2$ is used for temperature measurement.

Production of $AuIn_2$ $AuIn_2$ is a congruently melting compound whose melting point is approximately 544°C. It is prepared by melting together stoichiometric amounts of its constituents.

Samples of $AuIn_2$ prepared and used for temperature measurement (and of suitable purity for refrigeration) were prepared from 99.999 percent pure gold and 99.9999 percent pure indium. The ingots obtained by melting these materials together were placed in a zone refining apparatus and zone refined by four traverses of the molten zone, in order to obtain further purification and reduction of the quantity of unreacted indium included in the solid as a second phase. Samples thus prepared contained leas than 2 atom parts per million of $3d$ ion impurities, such as iron (the most common such impurity in gold) and less than 100 parts per million by volume of uncombined indium. A greater concentration of $3d$ ion impurities, or other impurities possessing a net electronic magnetic moment, is undesirable since the temperature independent portion of the measured susceptibility would be undesirably large, reducing the accuracy of measurement of the temperature dependent portion. It is this temperature dependent portion which is used for thermometry. A greater concentration of uncombined indium or other superconductor matter is undesirable because of the temperature dependent diamagnetism produced by its superconductivity. An unzonerefined sample was observed to contain at least 10 times this concentration of uncombined indium. The mass of $AuIn_2$ should contain less than a total of 1 percent of all impurities to reduce the possibility of lattice distortion producing an influence by the electronic magnetism on the nuclear magnetism by, for example, quadrupole effects.

$AuIn_2$ Thermometer

A static susceptibility thermometer operates by observation of the degree of alignment produced in the magnetic moments of the thermometric material by an externally applied magnetic field (*Experimental cryophysics*, Butterworth Press, London (1961) Page 246).

In the operating region of the thermometer the magnetization produced in such a substance can be represented by the expression $M=(CH/T-\Theta)$, where $M$ is the magnetic moment per mole produced by an applied static magnetic field of $H$ oersteds at a temperature, $T$. $C$ and $\Theta$ are material dependent constants, $\Theta$ being proportional to the square of the magnitude of the magnetic moment. At temperatures for which $T>>\Theta$, the measured susceptibility $\chi$ (=M/H) is equal to $C/T$. The thermometer can be calibrated at temperatures above the range of desired operation by evaluating $C$ at a known temperature and using this constant to measure lower temperatures as long as the condition $T>>\Theta$ is met.

Paramagnetic salts such as cerium magnesium nitrate operate by observation of electronic magnetic moments and their constants, $\Theta$, are of the order of millidegrees. This produces a limit to their lower temperature use. The $AuIn_2$ thermometer operates by observation of the nuclear magnetic moments of indium, which are $10^3$ smaller. Thus, $\Theta$ of $AuIn_2$ is of the order of $10^6$ times smaller making this thermometer potentially useful to below 1 microdegree K. The nuclear susceptibility of $AuIn_2$ has been measured to be equal to $(2.75 \times 10^{-6} /T)$ $(cm^3$ $°K/mole)$.

FIG. 1 shows in schematic form an apparatus using a quantity of $AuIn_2$ as a thermometer. An exemplary apparatus of this type made use of a bar of $AuIn_2$, 5 millimeters in diameter and 20 millimeters long cut from a zonerefined ingot. The $AuIn_2$ 10 is connected to the material whose temperature is to be measured 11 by a thermal link 12. In an exemplary apparatus the thermal link was a bundle of number 42 copper wires 15 centimeters long with a 4 millimeter overall diameter. These wires were soldered to the thermometer element 10 and the sample 11 with cadmium. The static magnetic field necessary for the temperature measurement can be provided by a well regulated external magnet 13 or by a superconducting magnet in the persistent mode, incorporated in the cryostat. The body of $AuIn_2$ 10 is coupled to a magnetometer probe 14 by a transformer consisting of superconducting wire 15. The magnetometer probe 14 is connected to a magnetometer 16 which yields the data producing the temperature measurement. Wellknown cryogenic techniques such as the use of liquid He are employed to keep various parts of this apparatus at the temperatures required for their operation. The elements within the schematic boundary 17 are cooled to temperatures below 0.1°K by such techniques as the use of a $He^3 - He^4$ dilution refrigerator or adiabatic demagnetization. The thermometer can be calibrated in the temperature range from 50 to 500 millidegrees Kelvin using a cerium magnesium nitrate susceptibility thermometer. Temperatures were measured using this $AuIn_2$ thermometer, as low as 1.7 millidegrees K. The estimated accuracy of the thermometer at this low temperature was approximately 2 percent. The measurement of lower temperatures was limited by the available refrigerator and not by any limitations of the thermometric system.

Figure 2:
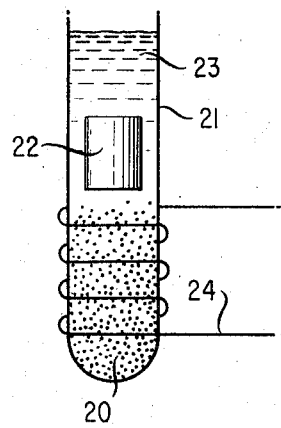
FIG. 2 is an elevational view of an apparatus using powdered $AuIn_2$ as a thermometric element.

In FIG. 2 a quantity of $AuIn_2$ powder 20 is included in a tube 21 together with the body whose temperature is to be measured 22 and a quantity of liquid $He^3$ 23. The use of the $AuIn_2$ powdered form enhances the thermal contact with the liquid $He^3$. The $He^3$ serves as the thermal link to the object 22 whose temperature is to be measured. A portion 24 of the superconducting transformer is shown.

$AuIn_2$ Refrigerator

The well-known technique of adiabatic demagnetization refrigeration (D. de Klerk, *Handbuch der Physik*,15 (1956) 38) makes use of the magnetic moments of the refrigerant material (in this case, the nuclear moments of $AuIn_2$) in the following fashion. The refrigerant is placed in contact with some primary refrigerator, such as a $He^3 - He^4$ dilution refrigerator, and placed in a large magnetic field. The magnetic field produces an alignment of the nuclear magnetic moments creating a more ordered state of the nuclear spin system. This increased ordering requires an outflow of thermal energy, which is absorbed by the primary refrigerator. The thermal link between the $AuIn_2$ and the primary refrigerator is then broken and the magnetic field reduced in magnitude. By reducing the magnetic field, the nuclear spin system has a tendency to become more disordered. Since the body of refrigerant ($AuIn_2$) is now thermally isolated, the increased disorder of the spin system can only be produced by reducing the state of disorder of the lattice. This reduced state of lattice disorder corresponds to a reduction of the temperature of the refrigerant body. If the refrigerant body is thermally linked to another body which the worker wishes to cool, the temperature of that second body will also be reduced, assuming that suitable precautions have been taken to reduce the heat leak to the surrounding apparatus. This heat leak reduction commonly requires that the refrigerant, the refrigerated body and the thermal link between them be isolated from the warmer surroundings by vacuum.

A refrigerant suitable for use in an adiabatic demagnetization refrigerator operating on the nuclear spin system requires much the same properties as a nuclear magnetization thermometer. As described above it is similarly required that the nuclear spins be as large as possible, that the relaxation time between the nuclear spin system and the lattice be as small as possible, and that the nuclear magnetization not be influenced by electronic quadrupole effects.

Since $AuIn_2$ is a conductor an additional physical limitation is imposed upon the body of $AuIn_2$ to be used as a refrigerant in order to reduce eddy current losses produced by electric currents induced by the decreasing magnetic field. The smallest dimension of the body should be no greater than approximately 1 millimeter. For example, the $AuIn_2$ can be in the form of 1 millimeter diameter rods or 1 millimeter thick plates. These can, for example, be extruded or otherwise grown in that physical form or cut from a larger ingot.

Figure 3:
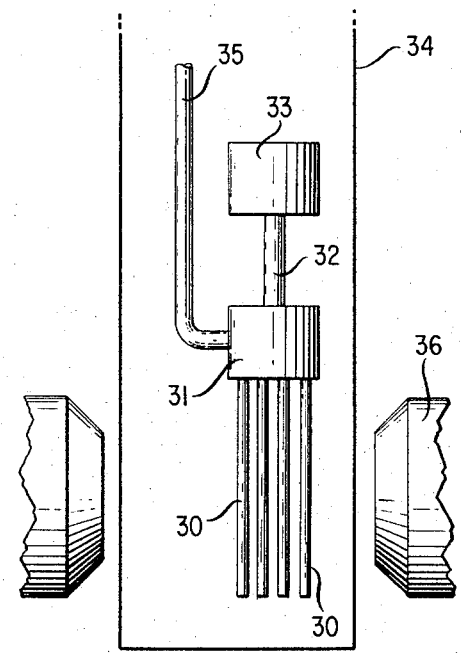
FIG. 3 is a schematic view of an exemplary refrigerator using $AuIn_2$ as a refrigerant.

FIG. 3 shows an exemplary adiabatic demagnetization refrigerator. The refrigerant element or elements 30 are maintained in a magnetic field which may be produced by an external magnet 36 or a superconducting magnet within the cryostat. These elements 30 are bonded to a metallic body 31 which is thermally linked by a thermal link 32 to the body 33 to be refrigerated. The remainder of the cryostat is symbolized by the heat shield 34. A thermal link to the primary refrigerator can be provided by a superconducting thermal switch 35, operated by the fringe field of the magnet 36. The thermal link to the primary refrigerator is then broken automatically reducing the magnetic field. The refrigerant elements 30 can be affixed to the metallic mount 31 by electrically conducting or an electrically insulating bonding agent. However an elecltrically conducting bonding agent is used. The region of the bond is to be shielded from the varying magnetic field in order to reduce eddy current losses. The magnitude of the field variation required depends upon the final temperature desired and the thermal mass of the body 33 which it is desired to cool. Generally, operation with a maximum field of the order of 50,000 oe. is contemplated.

What is claimed is:

1. A device for use at temperatures below 0.1°K comprising a mass of $AuIn_2$, wherein the $AuIn_2$ contains less than a total of 2 molar parts per million of matter possessing a net electronic magnetic moment, and wherein the $AuIn_2$ contains less than 100 parts per million by volume of superconductor matter as a second phase and wherein the total content of matter, other than $AuIn_2$, is no greater than 1 percent.

2. A device of claim 1 in which the $AuIn_2$ is in the form of at least one body, each body being affixed to a metallic body.

3. A device of claim 1, for use as a refrigerator in which at least a first portion of the $AuIn_2$ is composed of at least one body possessing a least dimension no greater than 1 millimeter.

4. A device of claim 3 in which the $AuIn_2$ is affixed to a body of metal different from $AuIn_2$.

* * * * *